United States Patent
Clifford (10) Patent No.: US 8,479,304 B1
(45) Date of Patent: Jul. 2, 2013

(54) SELECTIVELY PROTECTING AGAINST CHOSEN PLAINTEXT ATTACKS IN UNTRUSTED STORAGE ENVIRONMENTS THAT SUPPORT DATA DEDUPLICATION

(75) Inventor: Thomas G. Clifford, Edina, MN (US)

(73) Assignee: Symantec Corporation, Mountain View, CA (US)

( * ) Notice: Subject to any disclaimer, the term of this patent is extended or adjusted under 35 U.S.C. 154(b) by 497 days.

(21) Appl. No.: 12/415,577

(22) Filed: Mar. 31, 2009

(51) Int. Cl.
*H04L 29/06* (2006.01)

(52) U.S. Cl.
USPC .............................. 726/29; 713/193; 707/692

(58) Field of Classification Search
USPC .................................. 713/193; 726/28, 29, 30
See application file for complete search history.

(56) References Cited

U.S. PATENT DOCUMENTS

| | | | | |
|---|---|---|---|---|
| 4,713,753 A * | 12/1987 | Boebert et al. | 711/164 |
| 5,724,423 A * | 3/1998 | Khello | 713/184 |
| 6,711,677 B1 | 3/2004 | Wiegley | 713/151 |
| 6,983,365 B1 | 1/2006 | Douceur et al. | 713/165 |
| 7,016,495 B2 * | 3/2006 | Scheidt et al. | 380/45 |
| 7,152,047 B1 | 12/2006 | Nagel | 705/76 |
| 7,159,110 B2 | 1/2007 | Douceur et al. | 713/165 |
| 7,266,689 B2 * | 9/2007 | Douceur et al. | 713/165 |
| 7,389,424 B2 | 6/2008 | Yasuna et al. | 713/184 |
| 7,395,437 B2 | 7/2008 | Agrawal et al. | 713/193 |
| 7,451,315 B2 | 11/2008 | Coltrera | 713/170 |
| 7,454,612 B2 | 11/2008 | Bolosky et al. | 713/165 |
| 7,475,243 B2 | 1/2009 | Karaoguz et al. | 713/168 |
| 7,603,553 B1 | 10/2009 | Corbett et al. | 713/165 |
| 7,747,024 B2 | 6/2010 | Challener | 380/278 |
| 7,779,097 B2 | 8/2010 | Lamkin et al. | 709/223 |
| 7,886,158 B2 | 2/2011 | Osaki | 713/193 |
| 7,890,774 B2 | 2/2011 | Agrawal et al. | 713/193 |
| 7,916,328 B2 | 3/2011 | Miyamura et al. | 358/1.15 |
| 7,929,688 B2 * | 4/2011 | Yamamichi et al. | 380/1 |
| 7,949,785 B2 | 5/2011 | Alkhatib et al. | 709/245 |
| 7,991,155 B2 | 8/2011 | Fujioka et al. | 380/201 |
| 8,001,383 B2 | 8/2011 | Hughes | 713/171 |
| 8,005,227 B1 | 8/2011 | Linnell et al. | 380/279 |
| 8,024,762 B2 | 9/2011 | Britt | 725/92 |

(Continued)

FOREIGN PATENT DOCUMENTS

WO WO 01/86396 A2 11/2001

OTHER PUBLICATIONS

Secure Data Deduplication Oct. 31, 2008 by M. Storer, K. Greenan, D. Long, and E. Miller.*

(Continued)

*Primary Examiner* — Jung Kim
*Assistant Examiner* — Tri Tran
(74) *Attorney, Agent, or Firm* — Campbell Stephenson LLP (57) ABSTRACT

Various methods and systems for selectively protecting against chosen plaintext attacks when encrypting data for storage on an untrusted storage system are disclosed. One method involves generating an encryption key for use in encrypting data and generating an identifier for the data. Generation of the encryption key is based upon a hash of the data to be encrypted, and generation of the identifier is based upon the data to be encrypted and/or the encryption key. The method also involves detecting whether an encrypted copy of the data is already stored by a storage system, based upon the identifier. The method also detects whether a higher level of security has been specified for the data and, if so, modifies the data to be encrypted or the encryption key, based upon a client-specific value, prior to generating the identifier.

20 Claims, 7 Drawing Sheets

U.S. PATENT DOCUMENTS

| | | |
|---|---|---|
| 8,108,638 B2 | 1/2012 | Kishi ............................. 711/162 |
| 2003/0188180 A1 | 10/2003 | Overney ........................ 713/193 |
| 2004/0057579 A1 | 3/2004 | Fahrny ............................. 380/44 |
| 2004/0243814 A1 | 12/2004 | Nakano et al. ................. 713/189 |
| 2005/0273611 A1 | 12/2005 | Yoshimura .................... 713/176 |
| 2006/0129627 A1 | 6/2006 | Phillips et al. ................ 709/200 |
| 2006/0182281 A1 | 8/2006 | Taguchi et al. ............... 380/270 |
| 2006/0277593 A1* | 12/2006 | Buchholz ........................... 726/2 |
| 2008/0063193 A1 | 3/2008 | Nishioka ......................... 380/46 |
| 2008/0092239 A1 | 4/2008 | Sitrick et al. ................... 726/27 |
| 2008/0092240 A1 | 4/2008 | Sitrick et al. ................... 726/27 |
| 2008/0148067 A1 | 6/2008 | Sitrick et al. ................. 713/193 |
| 2008/0172563 A1 | 7/2008 | Stokes ........................... 713/193 |
| 2008/0244721 A1 | 10/2008 | Barrus et al. ....................... 726/9 |
| 2009/0276771 A1 | 11/2009 | Nickolov et al. ............. 717/177 |
| 2010/0191783 A1 | 7/2010 | Mason et al. ................. 707/822 |
| 2011/0038594 A1 | 2/2011 | Symons et al. ............... 386/224 |
| 2011/0219048 A1 | 9/2011 | Cross et al. ................... 707/821 |
| 2012/0011501 A1 | 1/2012 | Filali-Adib et al. .............. 718/1 |
| 2012/0011502 A1 | 1/2012 | Filali-Adib et al. .............. 718/1 |
| 2012/0011503 A1 | 1/2012 | Filali-Adib et al. .............. 718/1 |

OTHER PUBLICATIONS

Jerome Wendt, Storage Channel News, "Remote Data Backup Services and Software," SearchStorageChannel.com, Jan. 10, 2007, © 2006-2008, TechTarget, 4 pages, http://searchstoragechannel.techtarget.com, printed Jun. 4, 2008, 4 pages.

Mislove, et al., "POST: a secure, resilient, cooperative messaging system," USENIX, HotOS IX Paper, originally published in the Proceedings of HotOS IX: 9$^{th}$ workshop on Hot Topics in Operating Systems, May 18-21, last changed Aug. 26, 2003, 3 pages, http://www.usenix.org/eventshotos03/techfull_papers/mislove_html.

* cited by examiner

SELECTIVELY PROTECTING AGAINST CHOSEN PLAINTEXT ATTACKS IN UNTRUSTED STORAGE ENVIRONMENTS THAT SUPPORT DATA DEDUPLICATION

FIELD OF THE INVENTION

This invention relates to storage systems and, more particularly, to storing encrypted data on untrusted storage systems.

DESCRIPTION OF THE RELATED ART

There is a growing interest in being able to implement third-party storage systems. In such systems, an entity provides storage space to clients, who access the storage via a network. The entity can charge clients based upon the amount of storage space used by each client and/or the duration of time for which each client uses the storage space.

Typically, it is desirable for multiple different clients, who may be completely unaware of each other, to store data on the same storage system. This allows the entity providing the storage system to more efficiently utilize storage space. However, it also creates the risk that one client will be able to access another client's data.

In order to mitigate the above risk, many third-party storage systems provide a user interface that encrypts client data prior to storage. Alternatively, such systems can require that clients encrypt data prior to storage. In such systems, each client typically uses a user-specific encryption key to encrypt its data, ensuring that other clients, who do not have the same user-specific encryption key, cannot decrypt the client's data.

Unfortunately, the use of user-specific encryptions keys makes it difficult to perform data deduplication within the third-party storage system. In particular, even if multiple clients store the same file, the encrypted version of that file will differ among clients, since each version is encrypted using a different encryption key. Accordingly, opportunities to further increase the efficiency of third-party storage systems through the use of data deduplication may be lost.

SUMMARY

Various embodiments of methods and systems for selectively protecting against chosen plaintext attacks when encrypting data for storage on an untrusted storage system are disclosed. One method involves generating an encryption key for use in encrypting data and generating an identifier for the data. Generation of the encryption key is based upon a hash of the data to be encrypted, and generation of the identifier is based upon the data to be encrypted and/or the encryption key. The method also involves detecting whether an encrypted copy of the data is already stored by a storage system, based upon the identifier. The method also detects whether a higher level of security has been specified for the data and, if so, modifies the data to be encrypted or the encryption key, based upon a client-specific value, prior to generating the identifier.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Data deduplication involves reducing the number of copies of the same data that are stored by a particular storage system. For example, data deduplication can be used to achieve single-instance storage, in which only a single copy of each unique item of data (e.g., a volume, file, database, or a portion of such a volume, file, or database) is maintained on a storage system. Data deduplication can be performed by generating an identifier for each item of data. When a client attempts to store another copy of the same item of data to the storage system, the client will detect that a copy of the item of data is already stored at that address and will thus not store another copy of the item of data on the storage system. Detection of whether a copy of the item is already stored can involve providing the identifier generated for the item to the storage system and then receiving an indication from the storage system as to whether the item identified by that identifier is already stored.

Thus, when an item of data is stored in the storage system, that identifier can be used to reference the data. For example, when a client sends an item of data to a storage system, the user can also provide the associated identifier. To later retrieve the item of data, the client can provide the identifier and the storage system will return the associated item of data. In some embodiments (e.g., those that implement content addressable storage), the identifier is also used as the address at which the item of data is stored.

In systems in which multiple independent clients, who may not have trusted relationships with each other or with the entity that operates the storage system, use the same storage system to store items of data, each client can maintain the security of its data by encrypting data prior to storing the data on the untrusted storage system. In these systems, the identifiers can be based upon the data items themselves, such that only clients that actually have access to a particular item of data will be able to generate the identifier associated with that item of data. Accordingly, only those clients will be able to locate the item of data in the storage system. Thus, encryption transforms the item of data into a secure form that cannot be located or decrypted without having access to the particular item of data. Additional information used to encrypt the item of data, such as the encryption key and/or initialization vector, can also be dependent upon the item of data itself.

The above technique does have one potential vulnerability, which may be undesirable to some clients. In the above technique, a malicious user (or even the storage provider itself) can discover whether a client has stored a particular data item on the storage system if the malicious user has access to a copy of the particular data item (i.e., such a malicious user can simply use the above technique to generate the appropriate identifier and then attempt to access the particular data item in the storage system). This type of vulnerability is referred to as being susceptible to a chosen plaintext (i.e., unencrypted data) attack, since a malicious user can choose a particular set of unencrypted data, generate the appropriate identifier for that data, and then detect whether another client has stored an encrypted copy of that data on the untrusted storage system. It is noted that the malicious user may not be able to decrypt the data in this situation; however, the mere ability of malicious users to be able to identify whether the data is stored may still present a significant cause for concern.

In order to serve the needs of users who are concerned about this vulnerability, some embodiments allow users to select a higher level of security to be applied to some or all of their data. Default selections (e.g., specifying that certain types of files should have a higher level of security applied) can initially be configured for each client. Alternatively and/or additionally, a user can select, either during an initial configuration process or during operation, certain data to which a higher level of security should be applied to all or some of that user's data. The selections can either specify specific data to which a higher level of security is to be applied, or one or more criteria or rules that can be used to determine whether a higher level of security should be applied to a particular item of data. Thus, for a given client, some data may have a higher level of security while other data does not have the higher level of security. Each client will only be able to select security preferences for their own data; no client can select security preferences for another client's data.

If the higher level of security is selected, the above technique will modify either the data to be encrypted or the encryption key for that data, prior to the encryption process, such that someone who merely has access to another copy of the same data will not be able to tell whether that data is already stored by the storage system. While this will reduce the ability to perform deduplication for identical data items stored by different clients in situations in which at least one of those clients selects to use the higher level of security, it will decrease the clients' exposure to the potential vulnerability.

Many embodiments can use the same core functionality to perform encryption, regardless of whether the higher level of security is currently being implemented. This can provide a more simplified client interface to the storage system, since separate functionality does not need to be implemented for each desired level of security.

Allowing Data Deduplication on Untrusted Storage

Figure 1:
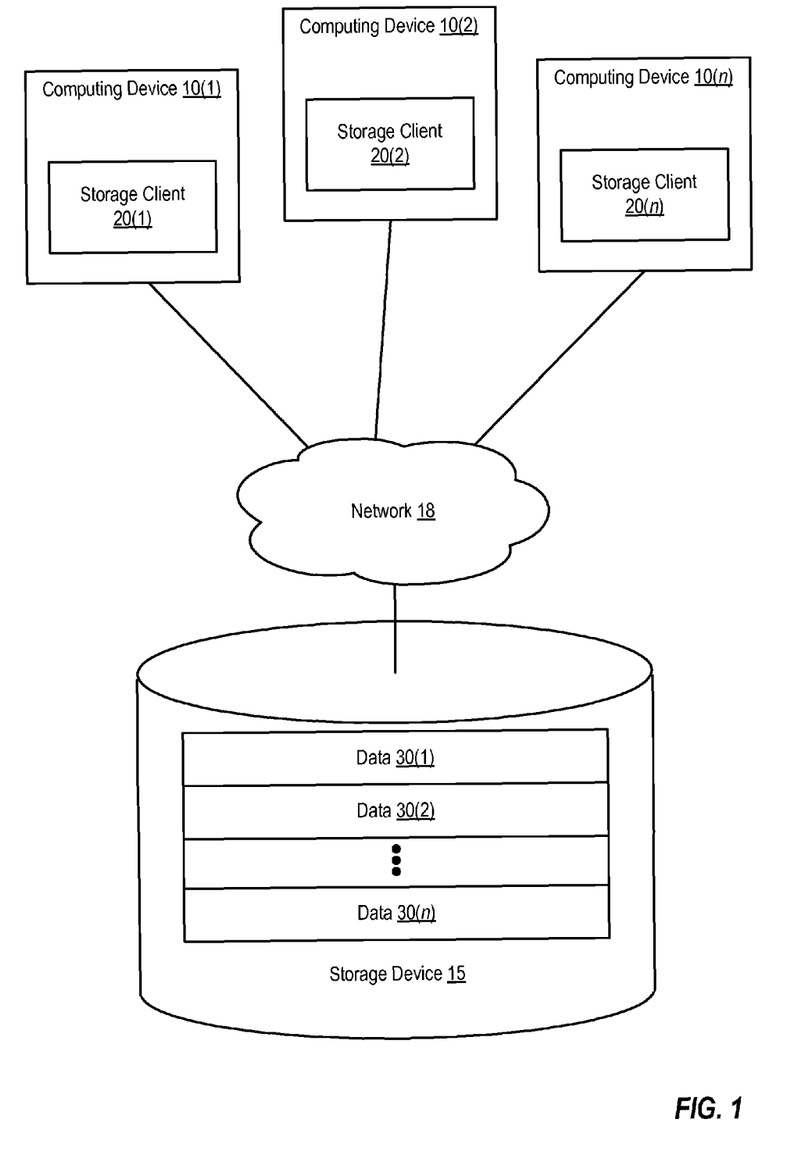
FIG. 1 is a block diagram of a system that supports data deduplication when storing encrypted data on an untrusted storage device, according to one embodiment of the present invention.

FIG. 1 illustrates a system that supports data deduplication when encrypted data is stored on an untrusted storage device by different clients. In FIG. 1, n computing devices 10(1)-10(n) are coupled to a storage device 15 by network 18. Network 18 can include a WAN (Wide Area Network), such as the Internet, one or more LANs (Local Area Networks), and/or one or more SANs (Storage Area Networks).

Each computing device implements a storage client that is configured to store encrypted client data to storage device 15 via network 18. As shown, computing device 10(1) implements storage client 20(1), computing device 10(2) implements storage client 20(2), and computing device 10(n) implements storage client 20(n).

The individual storage clients 20(1)-20(n) each store encrypted client data on storage device 15. Thus, storage client 201) on computing device 10(1) stores data 30(1), storage client 20(2) on computing device 10(2) stores data 30(2), and storage client 20(n) on computing device 10(n) stores data 30(n). In some embodiments, storage clients 20(1)-20(n) can be integrated within a file system, volume manager, or backup application.

Each computing device 10(1)-10(n) can be a personal computer, laptop computer, server, personal digital assistant, cell phone, or the like. One or more users can use each computing device to generate data, such as files, or send such data to each computing device. Copies of the data can be maintained locally (e.g., on a hard drive or other storage device or set of storage devices directly coupled to each computing device) or remotely (e.g., on a storage device coupled to a network maintained by the same entity as the computing device). The data can be generated by user applications (e.g., word processing programs, email programs, graphics programs, a database application, or the like) executing on the computing devices. Additionally, each computing device can access (e.g., read and/or write) copies of all or some of its user data on storage device 15. For example, in some embodiments, storage device 15 is used to store backups of data for each computing device.

Each computing device 10(1)-10(n) can be maintained and used by a different entity. For example, computing device 10(1) can be a laptop computer operated by an individual user in Austin, Tex., while computing device 10(2) can be a server computer system for a small business in Denver, Colo. The users of each computing device can be completely unaware of each other. Each user can also be unaware that the other users are using the storage space provided by storage device 15. These users are referred to herein as clients of the third party that operates storage device 15.

Storage device 15 provides persistent data storage. Storage device 15 can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Storage device 15 can also be a virtual or logical storage device that is implemented on such physical storage devices and/or storage systems. For example, storage device 15 can be a logical volume that is implemented on a RAID storage system. Storage device 15 can include one or more storage devices. Storage device 15 can also include one or more types of storage media, including solid state media (e.g., flash drives), optical media (e.g., CDs and DVDs), and magnetic media (e.g., hard disks or magnetic tape).

As noted above, storage device 15 can be maintained by a different entity than the entities that operate computing devices 10(1)-10(n). In such situations, storage device 15 can be described as a third-party storage device. This storage device is also referred to as an untrusted storage device, since there may not be an established trust relationship between the different clients and/or the third-party.

In one embodiment, the third party that operates storage device 15 provides storage as a service. In other words, the third party can sell access to and storage space on storage device 15 to clients. For example, access to the storage device can be provided by a service such as the Symantec Protection Network, available from Symantec Corporation of Cupertino, Calif.

In this example, each computing device 10(1)-10(n) is used by a different client of the storage system that includes storage device 15. These clients are not necessarily aware of each other's usage of storage device 15 and may not have any sort of relationship with each other. Accordingly, the entity that operates storage device 15 can control access to storage device 15 in a manner that ensures that different clients are not able to access each other's data.

For this reason, the third-party can provide storage clients 20(1)-20(n) to clients for the clients' use in accessing storage device 15. For example, when a client establishes a relationship with the third party in order to be able to access the third-party storage system that includes storage device 15, the third party can provide the client with a copy of a software application that includes the storage client. The storage clients 20(1)-20(n) are designed to access storage device 15 in a manner that guarantees that different clients cannot access each other's data. In particular, the storage clients can be designed to encrypt data prior to storage on the third party storage system. These storage clients 20(1)-20(n) are also designed to perform data deduplication, as described briefly above, as well as to allow a user to select a higher level of security (which does not facilitate data deduplication among different clients) to use in the encryption process, if desired. The storage clients 20(1)-20(n) (collectively referred to herein as storage clients 20) can perform data deduplication in a manner that only stores a single copy of each item of data on storage device 15, even if more than one client tries to store the same item of data, while also maintaining the security of each client's data.

To perform data deduplication while also maintaining data security among different clients, the storage clients 20 are configured to generate identifiers, which are used to locate items of data on storage device 15 (e.g., the identifiers can be used as addresses on storage device 15), based upon the items of data to be stored themselves. The identifier generation process is configured to generate the same identifier for identical items of data, while also generating different identifiers for non-identical items of data.

In one embodiment, each storage client 20 is configured to generate an identifier for an item of data by first calculating an encryption key for the item of data (e.g., by applying a cryptographic hash algorithm to the item of data, as described in more detail below). Then, the storage client 20 calculates the identifier for the item of data, based upon the encryption key (e.g., by applying a cryptographic hash algorithm to the encryption key). The storage client 20 then provides the identifier to storage device 15 (or to a controller or server associated with storage device 15, if such a controller or server is not part of the storage device). Storage device 15 (or an appropriate controller or server) then returns information to storage client 20, indicating whether an item of data associated with that identifier is already stored on storage device 15. If the item of data associated with the identifier is already stored, storage client 20 does not encrypt the item of data or store the encrypted item of data on the storage device. Accordingly, if an encrypted copy of the item of data is already stored on storage device 15, processing on storage client 20 can be avoided, as can the consumption of additional space on storage device 15. If instead the item of data associated with the identifier is not already stored, storage client 20 proceeds to encrypt the item of data, using the same encryption key that was used to generate the identifier, and to store the encrypted item of data on storage device 15.

Since the encryption key and identifier associated with each item of data are calculated from the item of data itself, clients that do not have access to the item of data cannot generate the identifier or the encryption key used to encrypt the item of data. For this reason, other clients will not be able to locate (using the identifier) or decrypt (using the encryption key) the item of data. Accordingly, security of client data is preserved, while also providing data deduplication among different clients.

Data deduplication allows just a single copy of an item of data to be maintained on storage device 15, even if multiple different clients want to store a copy of that same item of data. Examples of items of data that may be shared by multiple different clients include operating system files, application binaries, media files, and the like. Accordingly, if two different clients use the same operating system and perform full backups to storage device 15, only one copy of the shared operating system file(s) will be stored on storage device 15. However, both clients will be able to access that copy, using the identifier and encryption key that each client generated from its copy of the shared operating system file.

It is noted that the third party that operates the untrusted storage device cannot access any of the data stored on that storage device, since the third party will not be able to locate or decrypt that data. Accordingly, the third party cannot expose clients' data to other parties. Furthermore, the third party cannot police or otherwise control what types of data are being stored on the untrusted storage device. If chosen plaintext attacks (e.g., the ability of the third party or malicious users to determine whether a given item is stored on storage device 15) are a concern, the technique described below can be selected to further enhance security.

Figure 2:
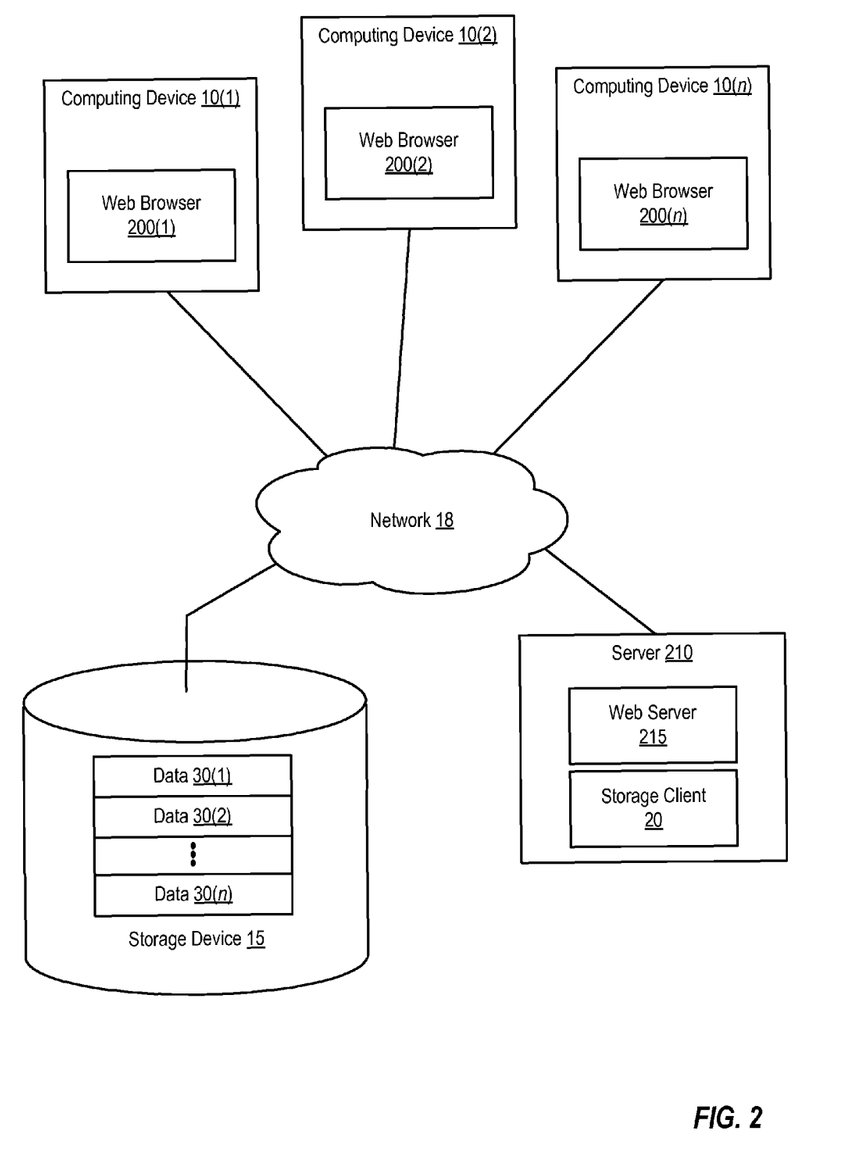
FIG. 2 is a block diagram of another system that supports data deduplication when storing encrypted data on an untrusted storage device, according to one embodiment of the present invention.

FIG. 2 illustrates another example of a system that performs data deduplication when storing encrypted data to an untrusted storage device. In this example, instead of each client's computing device executing its own storage client, a single storage client 20 executes on a server 210 coupled to network 18. Server 210 also implements a web server 215, which is configured to provide a web interface (e.g., in the form of hypertext markup language (html) pages) via which clients operating computing devices 10(1)-10(n) can interact with storage client 20 (e.g., in order to encrypt and store data on storage device 15). Accordingly, each computing device 10(1)-10(n) implements a respective web browser 200(1), which can receive and display web pages generated by web server 215 and return responsive information (e.g., selecting files or other items of data to be copied to storage device 15) to web server 215. Web server 215 can in turn provide the received information to storage client 20, which can then process the client's files in the manner described briefly above and in more detail below with respect to FIG. 3. In the system of FIG. 2, clients may initially access storage client 20 via a login and/or authentication process (e.g., implemented via web pages generated by web server 215). In this situation, each client computing device can store client-specific information (e.g., such as a client-specific seed value and/or client specific security rules, as described in more detail below) locally. This client-specific information can be provided to the shared storage client (e.g., via a secure communications protocol) as needed.

It is noted that many other variations can be implemented in addition to those shown in FIGS. 1 and 2. For example, some systems may implement a combination of the two systems, in which some clients operate their own storage clients executing on their own computing devices, while other clients access a storage client executing on the third party's computing device. Alternatively, some systems can implement a storage server that implements all or part of the data deduplication and/or encryption functions described herein. For example, storage clients can generate identifiers and send those identifiers to a storage server, which can support deduplication by checking to see whether data identified by those identifiers is already stored. In such a system, the storage clients can perform encryption and then send encrypted data to the storage server for storage on the untrusted storage device.

Figure 3:
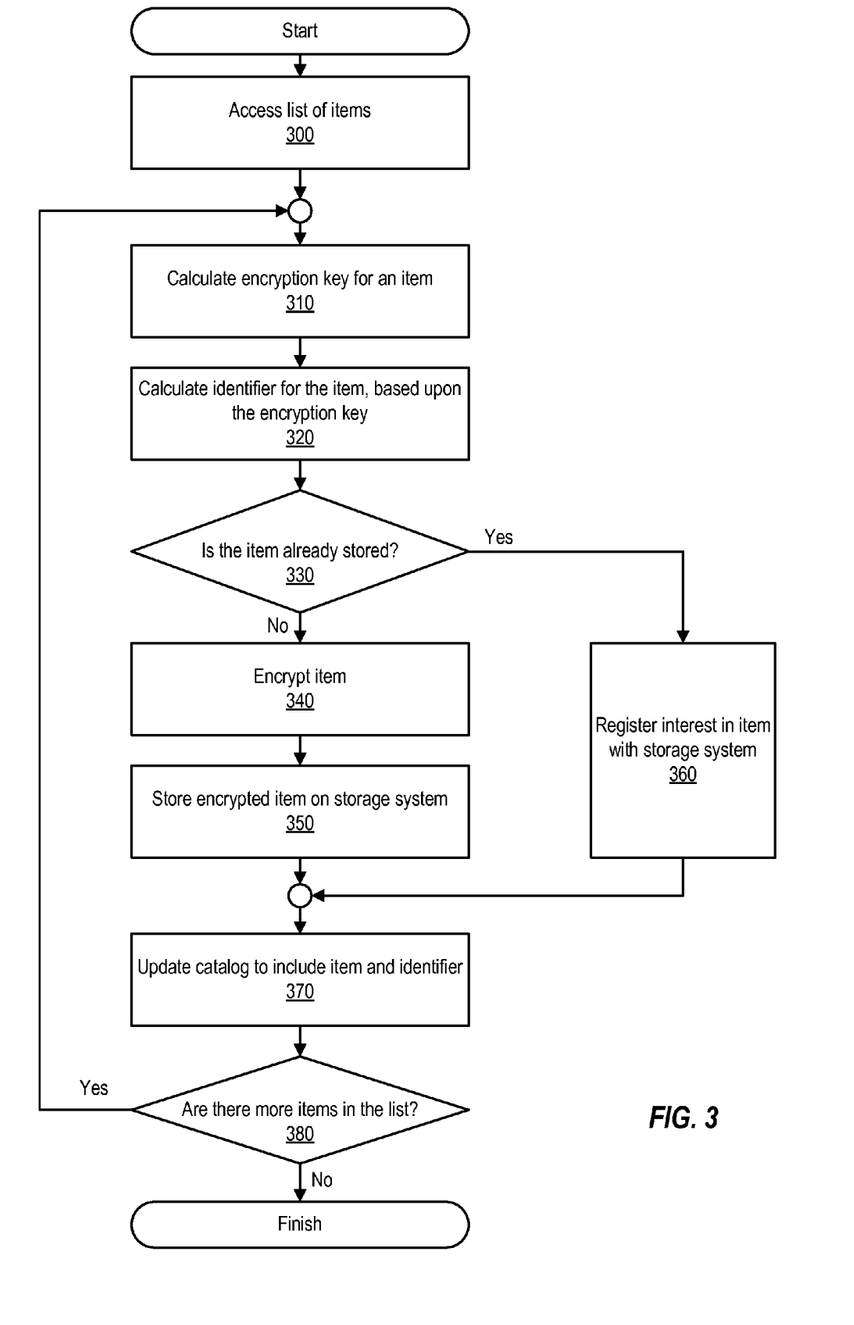
FIG. 3 is a flowchart of a method of performing data deduplication when storing encrypted data on an untrusted storage device, according to one embodiment of the present invention.

FIG. 3 is a flowchart of a method of performing data deduplication when storing encrypted data on an untrusted storage system. This method can be performed by a storage client like those shown in FIGS. 1 and 2, or any other storage module configured to perform encryption and deduplication for a client. The method can be used to store data items securely on a third-party storage system.

The method begins at 300, when the storage client accesses a list of items of data to be stored. The list can be, for example, a list of files or blocks to be backed up to the storage system. The list can be stored in a file or other data structure accessible to the storage client. If the storage client is executing remotely from the client's computing device (e.g., as shown in FIG. 2), the list can be transferred to the storage client via a network and then accessed locally by the storage client.

The storage client can then begin processing individual items of data. In some embodiments, the storage client can process multiple items of data simultaneously. In other embodiments, items of data are processed one at a time, in a serial manner. If the items of data are located remotely from the storage client, the storage client can access the items of data via a network (e.g., the client can upload files to the storage client, or the storage client can receive information identifying a network location of files, thus allowing the storage client to retrieve the files itself).

Operations 310-370 can be performed for each individual item of data. At operation 310, the storage client calculates an encryption key for the item to be stored. The encryption key can be calculated, for example, by applying a cryptographic hash algorithm to the item of data to generate a checksum. This checksum is then used as the encryption key for the item of data. In general, generation of the checksum can be performed in any manner that is substantially likely to only generate a particular checksum for a single item of data. In other words, the checksum generation method should be performed using a technique, like hashing (the act of applying a cryptographic hash algorithm), that is likely to not provide the same output for different inputs, while also always providing the same output for the same input.

At 320, an identifier for the item of data is calculated, based upon the encryption key calculated at 310. The identifier can be used as the address to which the item of data is stored on the storage device. In one embodiment, the identifier is calculated by hashing the encryption key. The cryptographic hash algorithm used to calculate the identifier can be the same algorithm used to calculate the encryption key in some embodiments. In other embodiments, different algorithms can be used. As with calculation of the encryption key, calculation of the identifier can be performed using any technique that is likely to generate different outputs for different inputs, while also being guaranteed to always generate the same output for the same input.

At 330, the storage client determines whether the item is already stored on the storage device. The storage client makes this determination based upon the identifier calculated at 320. In particular, the storage client can provide the identifier to the storage device (e.g., as an address), and the storage device can return an indication as to whether an item of data associated with that identifier is already stored by the storage device. Based upon the response received from the storage device, the storage client will decide whether to encrypt the item of data or not.

Thus, if the item is already stored, the storage client will not encrypt the item. In some embodiments, the storage client can register an interest in the item with the storage system, as shown at 360. Registering an interest in the item is a way for clients to inform the storage system that more than one client is interested in the item of data, and thus that the encrypted copy of that item of data should not be deleted from the storage system unless all of the clients that registered interest in the item are no longer interested. In one embodiment, registering an interest in an item is performed by sending the storage system the identifier associated with the item and causing the storage system to increment a counter associated with that identifier. Each time a client attempts to delete that item, the storage system decrements the counter but does not actually delete the item unless the counter has already reached a minimum value. If the counter has reached the minimum value, the storage system will delete the item. Alternative techniques for registering an interest can involve specifying a minimum storage time (e.g., one year) for the particular item of data.

Figure 4A:
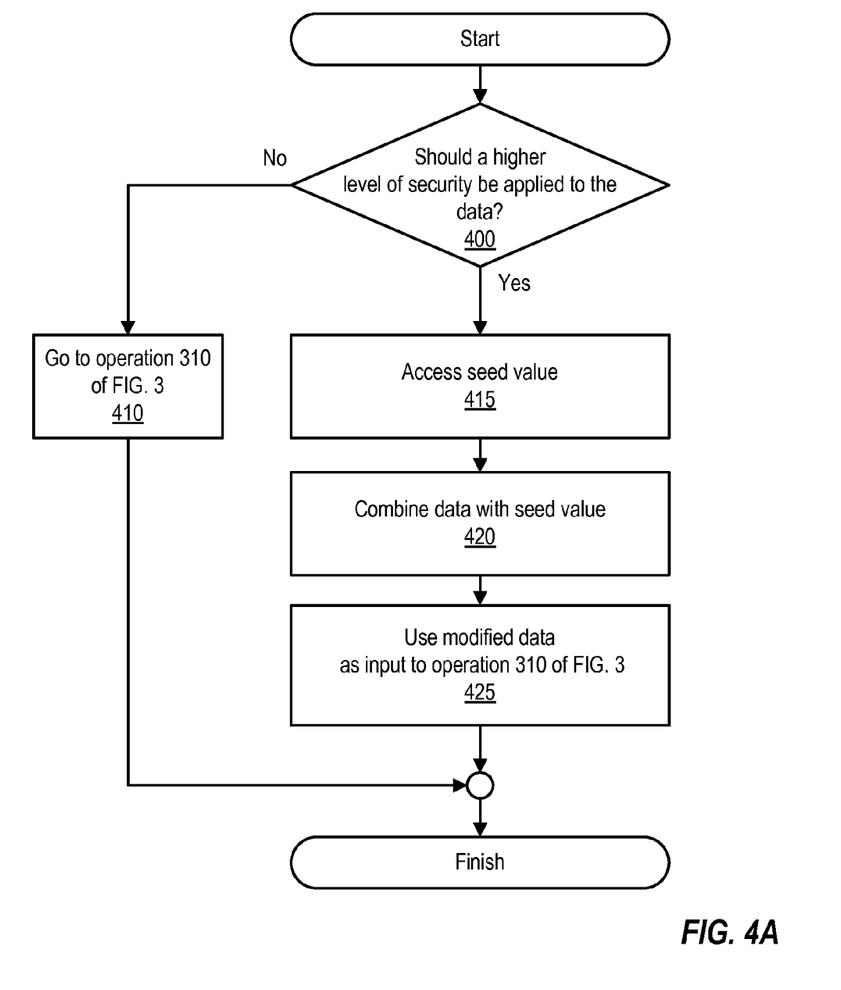
FIG. 4A is a flowchart of a method of one embodiment of a method of encrypting data for storage on an untrusted storage device in a manner that protects the encrypted data from chosen plaintext attacks, according to one embodiment of the present invention.

If the item is not already stored, the storage client does encrypt the item (or the modified version of the item generated by performing operation 420 of FIG. 4A, if a higher level of security is selected), as shown at 340. Encrypting the item is performed based upon several inputs in addition to the item being encrypted, including the encryption key generated at 310 (or at operation 465 of FIG. 4B, if a higher level of security is selected) and an initialization vector. In one embodiment, the initialization vector is generated by using a fingerprinting technique to sample the item of data to be encrypted. The resulting sample, which is a subset of the data to be encrypted, can then be hashed to get the initialization vector. After encryption, the encrypted copy of the item of data is stored on the untrusted storage system, as shown at 350.

Regardless of whether the item actually needed to be encrypted and transferred to the storage system, a catalog (e.g., a file or other item of data that identifies each item that the client has stored on the untrusted storage system) is updated to include each processed item of data, the encryption key calculated at 310 for that item of data, and the identifier calculated at 320 for that item of data. This process is shown at 370.

If there are more items in the list, as determined at 380, the storage client repeats operations 310-370 for each additional item. Once all items have been processed, the storage client can store the finished catalog. In some embodiments, the catalog can itself be encrypted (e.g., using an encryption key that is specific to the particular client associated with that catalog) and then stored on the untrusted storage system (e.g., for disaster recovery purposes). The client only needs to keep track of one identifier, the identifier associated with the encrypted copy of the catalog, in order to be able to access all of the client's data. When the client wants to retrieve data from the untrusted storage system, the client can use that identifier to retrieve the catalog. The client can then decrypt the catalog, using the client's client-specific encryption key, in order to find the identifier and encryption key associated with the item of data that the client wishes to retrieve.

In the above examples, the identifier is generated directly from the encryption key, and the encryption key is equal to a hash of the item of data to be encrypted. In alternative embodiments, the encryption key can instead be derived from the hash of the item to be encrypted (e.g., by truncating the hash, rotating the hash, or performing some other operation or combination of operations on the hash), and the identifier can be generated from the hash and/or the derived encryption key. When the encryption key is not equal to the hash of the item to be generated, all clients are configured to derive the encryption key in the same manner, such that all clients that have access to a given item of data will generate the same encryption key for that item of data. In general, the encryption key can be described as being based upon a hash of the item of data to be encrypted, since the encryption key is either equal to the hash or derived from the hash in a manner that is consistent among clients. The identifier can also be described as being based upon the hash of the item of data to be encrypted, since the identifier is generated by processing that hash and/or processing the encryption key, which is either equal to the hash or derived from the hash.

Enhanced Security to Prevent Chosen Plaintext Attacks

FIG. 4A is a flowchart of a method of one embodiment of a method of encrypting data for storage on an untrusted storage device in a manner that protects the encrypted data from chosen plaintext attacks. This method can be performed by a storage client like those shown in FIGS. 1 and 2, or any other storage module configured to perform encryption and/or deduplication for a client. The method can be used to store data items securely on an untrusted (e.g., third-party) storage system. The method of FIG. 4A can be used to prevent chosen plaintext attacks, regardless of whether the identifiers are derived from the encryption keys or directly from the data to be encrypted.

Before the method of FIG. 4A begins, an administrator or other user can configure one or more security rules, which indicate which items of data, if any, should have a higher level of security applied to them. When the higher level of security is specified for an item of data, that item will be encrypted in a manner that protects that item from chosen plaintext attacks. The security rules can be specified by the provider of the storage client and/or a client of a third-party storage system.

In some embodiments, the provider of the storage client configures the storage client with a set of default security rules. These default rules can specify that certain types of files (e.g., word processing documents, emails, and the like) should have a higher level of security applied to them. In one embodiment, the default rules are the only security rules that are available (e.g., users are not allowed to modify or supplement the default rules).

The provider of the storage client can, in some embodiments, configure the storage client to include a user interface via which clients can select additional security rules and/or modify the default rules (if default rules are provided). For example, the storage client can cause information identifying the option to specify custom security rules to be displayed on a visual display device such as a liquid crystal display or cathode ray tube monitor. The option can be displayed in a graphical user interface (e.g., as part of an installation wizard or storage as a service control menu), command line interface, or the like. For example, the option can be displayed as a checkbox, button (e.g., "click to select maximum security settings"), drop down menu, dialog box, or the like.

The user can configure the security rules when the user's storage client is installed. In some embodiments, the user is allowed to modify the security rules at any time (e.g., by selecting a configuration or settings option in a user interface provided by the storage client).

In some embodiments, security rules specify data to which a higher level of security should be applied by specifying characteristics of the data. For example, rules can be specified for sets of data, such as file systems, directories, and/or individual files, based upon the identity and/or location of those sets of data. Thus, a user can select to apply a higher level of security to data stored in one file system but not to data stored in another file system. Similarly, a user may select some, but not all, of the directories within a file system. A user may also or alternatively select some, but not all, of the user's files to have a higher level of security. Such selections can be made by browsing one or more file systems and selecting the individual file systems, directories, and/or files for which a higher level of security is desired. In one embodiment, data is selected by specifying logical block addresses or ranges of such logical block addresses.

Instead of (or in addition to) selecting items of data individually based upon their identity, the user can instead select items of data based upon their type. For example, a user can specify that all files having a certain extension (e.g., .doc, .xml, and the like) should have a higher level of security applied. Other file attributes (e.g., ownership, creation timestamp, most recent access timestamp, most recent modification timestamp, access permissions, and the like) can also be specified, such that all files having the specified attribute(s) will have the higher level of security applied.

In some situations, an item of data may initially have one attribute value, but that attribute value may change over time. The security rules can allow a user to specify whether the original attribute value or the current attribute value (or some combination of the two) should be used to determine whether the higher level of security is applied to the item of data.

Instead of (or in addition to) specifying item attributes or names in the security rules, the user may specify certain data patterns. In this situation, the storage client will apply the higher level of security to items of data that contain or are associated with that data pattern. The data pattern can be the identifier used in deduplication (i.e., a value that is generated from the item of data), a keyword, phrase, or the like contained within the item of data, or any other pattern included within or associated with the item of data. Thus, one security rule can specify that if an item of data's identifier (e.g., as calculated at 320 of FIG. 3) equals a prespecified identifier, then the higher level of security should not be applied to that item of data (e.g., because that item of data has a well known, public identifier). Similarly, a user can specify that all files containing a particular word or phrase (e.g., "confidential," "privileged," or the like) should have the higher level of security applied. The rules can specify the pattern as a Boolean or natural language search query.

Certain rules criteria (e.g., identity and file attributes) can be evaluated at run time, when the storage client is determining how to process each item of data to be stored on the untrusted storage device. Evaluation of other rules criteria (e.g., data patterns) may be somewhat time consuming. In order to improve performance, the storage client can, in some embodiments, be configured to evaluate some or all of the rules criteria as a background process. The storage client can access each item of data and determine whether certain rules criteria apply to that item of data. The storage client can then set metadata (e.g., such as an extended attribute) for the item of data to indicate whether the higher level of security should be applied to that item of data. More details of this process can be found in the description of FIG. 5 below.

In some embodiments, the user can specify that all items of data should have the higher level of security applied by default, and then select (e.g., based upon identity, attributes, or data patterns) certain items of data to exclude from that default rule. Thus, instead of specifying that a particular item should have a higher level of security applied, a security rule can specify that a particular item should not have the higher level of security applied.

The method of FIG. 4A begins by detecting whether data being sent to a third-party storage device should be more securely encrypted, as shown at 400. In one embodiment, this operation involves accessing one or more security rules, which can be specified by the provider of the storage client and/or a user of the storage client, and then determining whether any of the rules apply to the data. As noted above, this determination can involve comparing the data's identity, characteristics, and/or content to corresponding criteria in the security rule(s). Alternatively, if the storage client has already processed the client's data based upon the rules and set an attribute to indicate whether the higher level of security should be applied, the determination at 400 can involve simply accessing the data's attribute, since the value of the attribute indicates whether the higher level of security should be applied.

If the higher level of security should not be applied to the data, encryption will proceed according to the method of FIG. 3, and thus control can proceed to operation 310 of FIG. 3, as shown at 400-410.

If instead the higher level of security should be applied to the data, the encryption of that data is handled in the manner shown at 415-425. The encryption of any other data that has not been selected to be more securely encrypted can still be handled in the manner shown in FIG. 3.

Thus, if the client has selected to more securely encrypt a given item of data, encryption of that item of data begins by the storage client accessing a seed value, as shown at 415. The seed value is a value that is unique to the client, and that the client maintains in a confidential manner. The seed value can be stored on the client's computing device in a location applicable to the storage client (e.g., the seed value can be stored as part of the storage client's configuration settings). The seed value can be user-specified (e.g., entered in response to a prompt during storage client installation) or generated by the storage client (e.g., using a random number generator). Accessing the seed value involves reading the seed value from a storage location (e.g., in memory or on disk).

The storage client then combines the seed value with the item of data to be encrypted, as shown at 420. In general, the combination of the seed value with the item of data can be performed in any manner that is reversible and predictable. For example, if the seed value is one byte in size, combining the seed value and the item of data can involve performing a logical exclusive-OR (XOR) operation on the seed value and the first byte of the item of data. Other reversible operations can also be performed.

In some embodiments, details regarding the seed value and/or technique for combining the seed value and item of data can be specified by a client (e.g., during configuration and/or installation of the storage client). For example, a user can be prompted to specify the size of the seed value (e.g., in terms of bits or bytes), as well as which portions of a given data item should be combined with the seed value (e.g., for a one-byte seed value, the user can be prompted to select whether that seed value will be combined with the first or last byte of data items being encrypted). If such information is specified, this information can be stored (e.g., as part of the configuration settings for the storage client) and then used to control performance of operations 415 and/or 420. In other embodiments, seed values are all the same size for all clients and the same combination technique is used by all clients.

The modified data generated at 420 can then be input to operation 310 of FIG. 3. In other words, this modified data can be used as the data from which the identifier, encryption key, and encrypted data are generated.

To decrypt data that was modified using the techniques of FIG. 4A (e.g., in response to the client requesting to restore that data from a backup stored on the third-party storage device), a storage client can use the identifier (generated using the method of FIG. 3 and stored in the catalog) to request the data from the storage system. The storage client can then use the encryption key (also generated using the method of FIG. 3 and stored in the catalog) to decrypt the data, resulting in the modified data generated at 420. The storage client then reverses operation 420. For example, if an XOR operation was used to combine the first byte of the data with the seed value, the storage client can simply again perform an XOR of the first byte of the data and the seed value. The result of reversing operation 420 is the original, unencrypted and unmodified data.

By modifying the data in a client-specific manner prior to encrypting the data, the storage client ensures that the identifier generated for that data will not be the same as the identifier that would be generated for the non-modified version of the data. Accordingly, even if a malicious user has access to a copy of the data and is configured to use the same technique (e.g., the method of FIG. 3) to encrypt and/or access data stored on the third-party storage device, that malicious user will not be able to perform a successful chosen plaintext attack, since the malicious user will not be able to generate the same identifier used by the storage client.

Figure 4B:
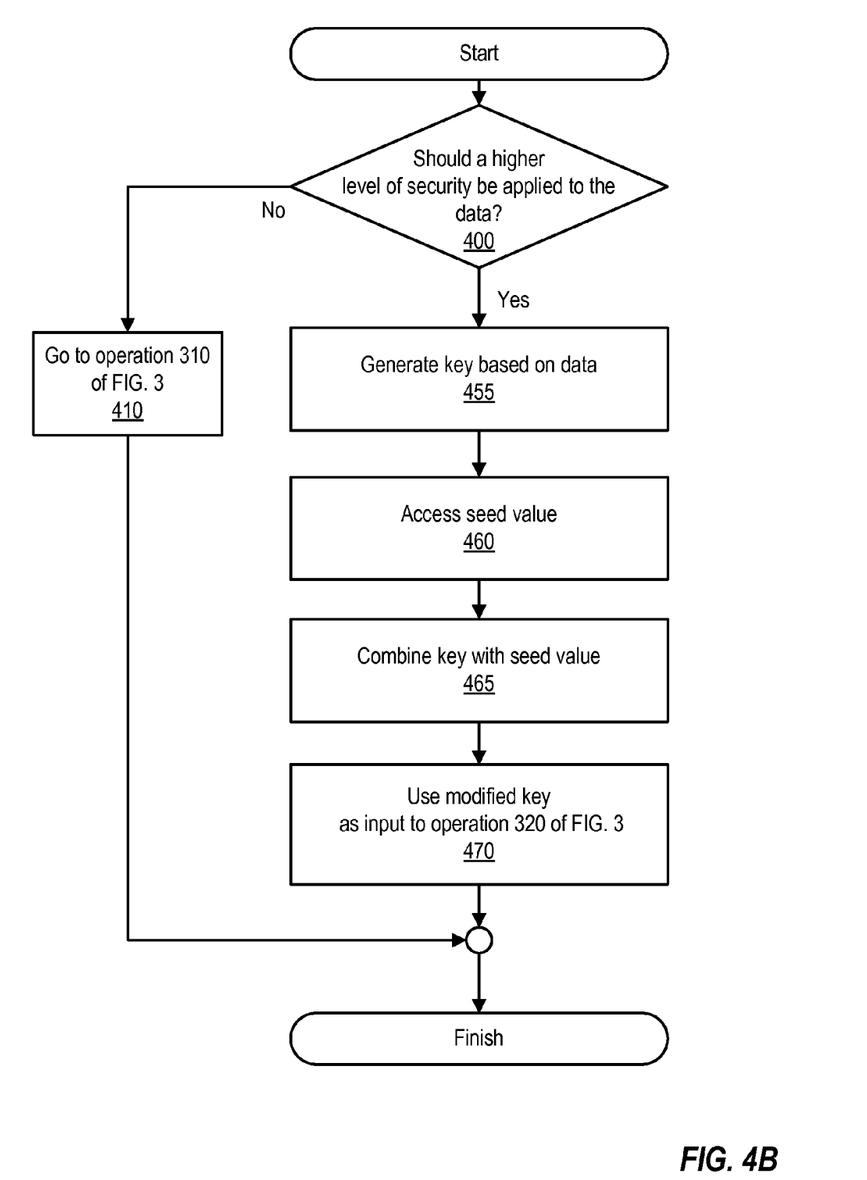
FIG. 4B is a flowchart of another method of one embodiment of a method of encrypting data for storage on an untrusted storage device in a manner that protects the encrypted data from chosen plaintext attacks, according to one embodiment of the present invention.

FIG. 4B is a flowchart of another method of one embodiment of a method of encrypting data for storage on an untrusted storage device in a manner that protects the encrypted data from chosen plaintext attacks. Like the method of FIG. 4A, this method can be performed by a storage client like those shown in FIGS. 1 and 2, or any other storage module configured to perform encryption and/or deduplication for a client. The method can be used to store data items securely on an untrusted (e.g., third-party) storage system. The method of FIG. 4B includes several of the same operations (400 and 410) as FIG. 4A, and these operations can be performed in the same manner as described above with respect to FIG. 4A. The method of FIG. 4B can be used to protect against chosen plaintext attacks in systems in which the identifier used to identify data stored on the third-party storage device is derived from the encryption key.

In the method of FIG. 4B, if the higher level of security should be applied to an item of data (as determined at 400), the encryption of that data is handled in the manner shown at 455-470. The encryption of any other data that has not been selected to be more securely encrypted can still be handled in the manner shown in FIG. 3

Thus, a given item of data should be more securely encrypted, encryption of that item of data begins by the storage client generating an encryption key based on the data, as shown at 455. Operation 455 can be performed in the same manner as operation 310 of FIG. 3.

The storage client accesses a seed value, as shown at 460 (e.g., in a similar manner as operation 415 of FIG. 4A). As described above, the seed value is a value that is unique to the client, and that the client maintains in a confidential manner.

The storage client then combines the seed value with the encryption key, as shown at 465. In general, like the combination of a seed value and an item of data, the combination of the seed value with the encryption key can be performed in any manner that is reversible and predictable. For example, if the seed value is one byte in size, combining the seed value and the encryption key can involve performing a logical exclusive-OR (XOR) operation on the seed value and the first byte of the encryption key. Other reversible operations can also be performed.

In some embodiments, details regarding the seed value and/or technique for combining the seed value and encryption key can be specified by a client (e.g., during configuration and/or installation of the storage client). For example, a user can be prompted to specify the size of the seed value (e.g., in terms of bits or bytes), as well as which portions of a given encryption key should be combined with the seed value (e.g., for a one-byte seed value and an eight-byte encryption key, the user can be prompted to select the byte of the encryption key with which the seed value will be combined). If such information is specified, this information can be stored (e.g., as part of the configuration settings for the storage client) and then used to control performance of operations 460 and/or 465. In other embodiments, seed values are all the same size for all clients and the same combination technique is used by all clients.

The modified encryption key generated at 465 can then be input to operation 320 of FIG. 3. In other words, this modified encryption key can be used as the encryption key from which the identifier and encrypted data are generated.

To decrypt data that was modified using the techniques of FIG. 4B (e.g., in response to the client requesting to restore that data from a backup stored on the third-party storage device), a storage client can use the identifier (generated using the method of FIG. 3 and stored in the catalog) to request the encrypted data from the storage system. The storage client then obtains the modified encryption key (e.g., from the catalog) and reverses operation 465 on this modified encryption key. For example, if an XOR operation was used to combine the second byte of the encryption key with the seed value, the storage client can simply again perform an XOR of the second byte of the encryption key and the seed value. The result of reversing operation 420 is the original encryption key generated at 455. The storage client can then use this original encryption key to decrypt the data, resulting in the original unencrypted data.

By modifying the encryption key in a client-specific manner prior to encrypting data using that encryption key, the storage client ensures that the resulting encrypted data and its identifier will not be the same as those generated by for the same copy of the data by another client that does not modify its encryption key or that modifies its encryption key in a different manner (e.g., by using a different seed value). Accordingly, even if a malicious user has access to a copy of the data and is configured to use the same technique (e.g., the method of FIG. 3) to encrypt and/or access data stored on the third-party storage device, that malicious user will not be able to perform a successful chosen plaintext attack, since the malicious user will not be able to generate the same identifier used by the storage client.

One issue that may arise when different clients modify their data and/or encryption keys prior to encryption is that different (unencrypted) data items may now result in the same identifier. For example, client A can modify data A in a manner that results in an encrypted value X having an identifier Y. Client B can modify data B, which does not have the same value as data A, in a manner that results in the same encrypted value X and identifier Y. In this situation, since the encrypted value and identifier are the same, the storage system can deduplicate the encrypted data being stored. Thus, if client A adds its copy of encrypted value X to the storage system first, client B will detect that the value is already stored when client B attempts to store encrypted value X to the third-party storage system. Accordingly, client B can simply register its interest in that data, as described above with respect to FIG. 3.

Alternatively, instead of allowing deduplication of encrypted data that has been selected for a higher level of encryption security, the third-party storage system can associate both the encrypted data's identifier and a client-specific identifier with the encrypted data. Only encrypted data items having both the same identifier and the same client-specific identifier are deduplicated, such that multiple copies of the same encrypted data can be present on the same third-party storage device, if each of those copies was presented to the third-party storage device by a different client.

Configuration of Enhanced Security

Figure 5:
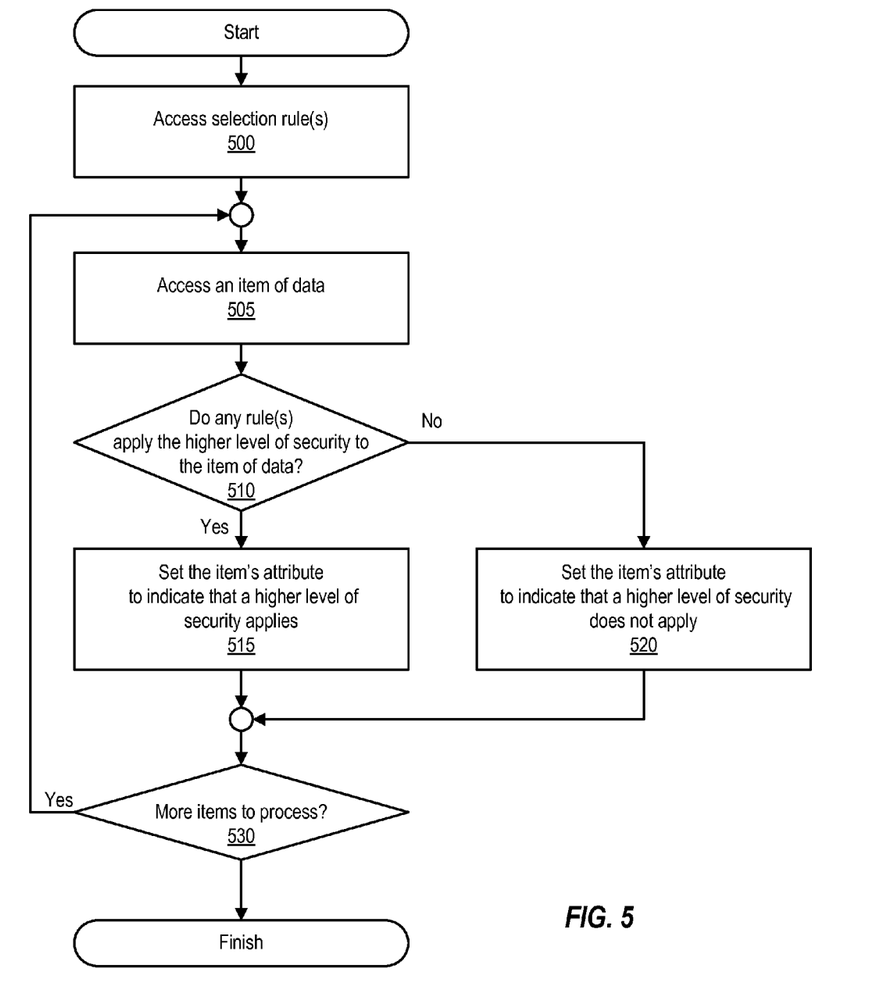
FIG. 5 is a flowchart of a method of processing items of data and setting attribute values that indicate whether a higher level of security should be applied to the items of data, according to one embodiment of the present invention.

FIG. 5 shows a technique that can be used to process an item of data as a background process in order to set an attribute indicating whether the higher level of security should be applied to that item of data. In embodiments that use this technique, when the storage client is later determining how to encrypt the item of data for storage on the untrusted storage device, the storage client can simply access the attribute to determine whether the higher level of security should be applied. The method of FIG. 5 can be performed by a storage client. In some embodiments, this method is performed as a background process by the storage client. The method can be repeated at regular intervals or in response to predetermined stimuli (e.g., a user request to reprocess the items of data, an indication that new items of data have been created, or the like).

This technique begins at 500, when a set of one or more storage rules is accessed. The storage rules, as noted above, can specify various characteristics of items of data, as well as whether the presence or lack or those characteristics should result in the higher level of security being applied. The characteristics can include one or more identities (e.g., file names or names of organizational structures, such as file systems, directories, databases, table spaces, and the like in which an item of data can be included), attributes, content, and the like.

In some embodiments, the technique of FIG. 5 processes items of data based upon some, but not all, of the rules (e.g., the technique of FIG. 5 can be used to process rules specifying content, but not rules specifying attributes). In other embodiments, the technique of FIG. 5 processes items of data based upon all of the rules.

At 505, an item of data is accessed. The item of data can be a file or other logical object (e.g., such as an object within a database). The item of data can be one of many items of data to be processed. In such a situation, the items of data can be accessed in a particular order (e.g., by traversing a file system or database structure).

At 510, a determination is made as to whether any of the rules accessed at 500 specify that a higher level of security should be applied to the item of data accessed at 500. This determination can involve comparing the item's identity to an identity specified in a rule, determining whether the item is located (e.g., logically or physically) within a location (e.g., a file system, database, directory, range of addresses, or the like) specified in a rule, comparing one or more of the item's attributes to one or more attribute values specified in a rule, searching the item for a particular data pattern, and/or processing the item to see if a particular data pattern (e.g., such as the identifier used to identify the item on an untrusted storage device) is generated during processing. Comparisons may involve detecting whether a value associated with the item is greater than, equal to, or less than a value specified in the rule.

If operation 510 determines that the higher level of security should be applied to the item of data, one of the item's attributes is set to a value that indicates that the higher level of security should be applied to the item, as shown at 515. Similarly, if operation 510 determines that the higher level of security should not be applied to the item of data, one of the item's attributes is set to a value that indicates that the higher level of security does not apply. This attribute can include one or more bits, and the values of the attribute can be prespecified (e.g., a logical one indicates that the higher level of security applies, while a logical zero indicates that the higher level of security does not apply).

In one embodiment, the item of data is a file and the attribute that is modified to indicate whether the higher level of security applies to the file is an extended attribute of the file. An extended attribute is an attribute that is maintained by the file system, but not defined or used by the file system. The extended attribute can be part of the file or stored separately from the file.

If there are more items of data to be processed, as determined at 530, the method returns to operation 505 and accesses the next item of data. If all items of data have been processed, the method ends. Upon completion of the method, the items of data each have an attribute that indicates whether or not the higher level of security should be applied to that item data. When performing the method of FIG. 4A or 4B, the storage client can simply use this attribute to determine how to encrypt the item of data, instead of having to evaluate all of the security rules for the item of data.

Storage Client

Figure 6:
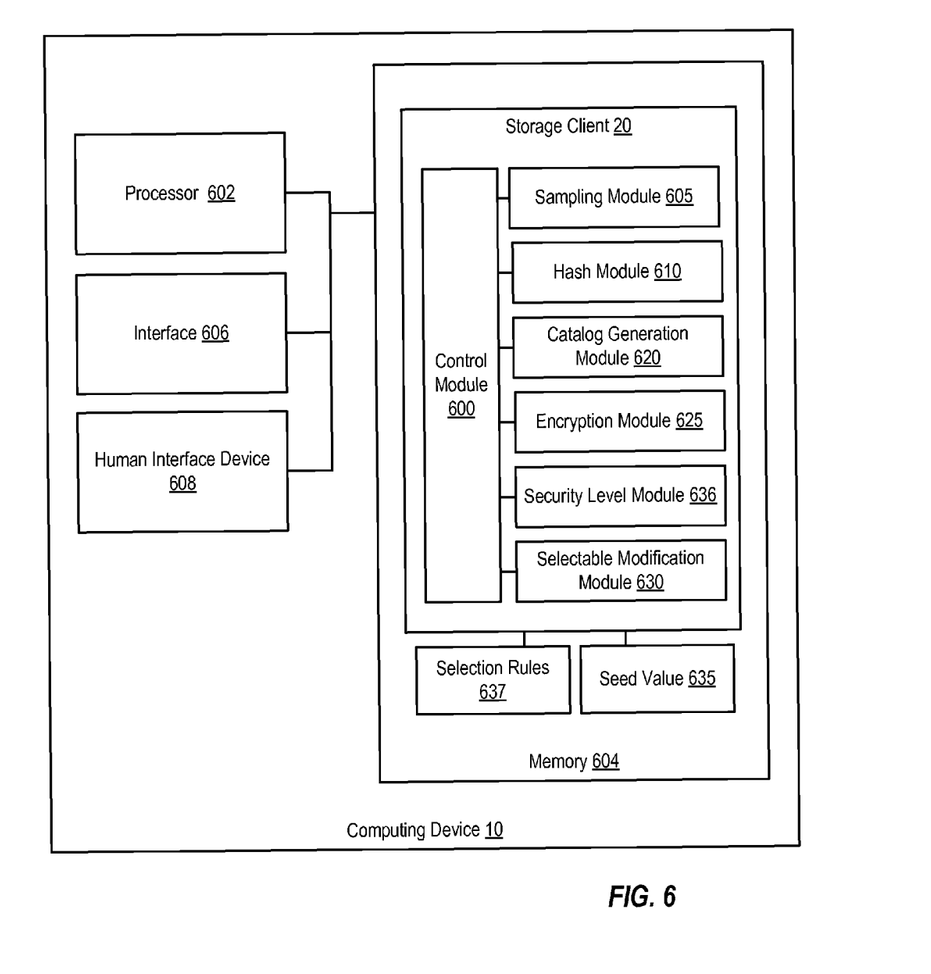
FIG. 6 is a block diagram of a computing device that implements a storage client that can perform data deduplication and/or provide protection against chosen plaintext attacks when storing encrypted data on an untrusted storage device, according to one embodiment of the present invention.

FIG. 6 illustrates how certain elements of a storage client 20 can be implemented in software. FIG. 6 is a block diagram of a computing device 10 (e.g., one of computing devices 10(1)-10(n) of FIG. 1 or server 210 of FIG. 2). As illustrated, computing device 10 includes one or more processors 602 (e.g., microprocessors, Programmable Logic Devices (PLDs), or Application Specific Integrated Circuits (ASICs)) configured to execute program instructions stored in memory 604. Memory 604 can include various types of Random Access Memory (RAM), Read Only Memory (ROM), Flash memory, Micro Electro-Mechanical Systems (MEMS) memory, magnetic core memory, and the like. Memory 604 can include both volatile and non-volatile memory. Computing device 10 also includes one or more interfaces 606. Processor 602, interface 606, human user interface device 608, and memory 604 are coupled to send and receive data and control signals by a bus or other interconnect.

Interface 606 can include a network interface to various networks (e.g., such as network 18 of FIGS. 1 and 2) and/or interfaces to various peripheral buses. Interface 606 can also include an interface to one or more storage devices (e.g., storage device 15 of FIGS. 1 and 2). Interface 606 can, for example, be used to access information stored on storage device 15, to send identifiers to storage device 15, and to receive information from storage device 15 indicating whether an encrypted copy of an item identified by a particular identifier is already stored. Similarly, interface 606 can be used to communicate with a client's web browser or other user interface if storage client 20 is executing remotely from the client's computing device.

Human user interface 608 can include one or more of a variety of different human user input and/or output devices, and/or one or more interfaces to such input and/or output devices. Such input and/or output devices can include monitors or other displays, keyboards, keypads, mice, electronic tablets, touch screens, audio speakers, and the like. Input (e.g., configuring selection criteria) to and output from storage client 20 can be received and/or sent via such an input and/or output device.

In this example, program instructions and data executable to implement all or part of certain storage client functionality, including a control module 600, a sampling module 605, a hash module 610, a catalog generation module 620, an encryption module 620, a selectable modification module 630, and a security level module 636 are stored in memory 604. Information usable by the storage client, such as seed value 635 and selection rules 637, can also be stored in memory 604.

Control module 600 is configured to control the operations of sub-modules within storage client 20. Control module 600 can also generate information usable to provide a user interface to clients (e.g., control module 600 can provide information usable to present a graphical user interface, command line interface, or web-based interface). In response to receiving information (e.g., such as the list described with respect to FIG. 3) identifying one or more items of data (e.g., files, databases, tables, blocks, extents, or the like) to be copied to an untrusted storage device, control module 600 can parse the received information and control the processing of individual items.

Hash module 610 is configured to generate the encryption key and identifier by applying one or more cryptographic hash algorithms to an item of data or data, such as an identifier, derived from the item of data. Accordingly, for each item identified in the information provided to the storage client, control module 600 can cause hash module to generate the appropriate encryption key and identifier. Control module 600 can then provide the identifier to the untrusted storage device and receive responsive information, via interface 606, indicating whether the item of data associated with that identifier is already stored on the untrusted storage device.

If the item of data is already stored, control module 600 can cause catalog generation module 610 to update the catalog of items stored on the untrusted storage device to include the identifier, encryption key, and other information (e.g., such as a file name) for the item of data. After all items have been processed, control module 600 can provide the catalog generated by catalog generation module 620 to encryption module 625 for encryption, using a client-specific encryption key, and then store an encrypted copy of the catalog on the untrusted storage device. Control module 600 can also register an interest in the item of data with the untrusted storage device, as described above.

If instead the item of data is not already stored, control module 600 can cause sampling module 605 to sample the item of data to generate an initialization vector, and then provide the encryption key generated by hash module 610 and the initialization vector generated by sampling module 605 to encryption module 625, which then encrypts the item of data based upon these inputs. Control module 600 can then cause the encrypted copy of the item of data to be stored to the untrusted storage device and cause catalog generation module 620 to update the catalog to identify the item of data as well as the identifier and encryption key generated by hash module 610.

Security level module 636 is configured to detect whether an item of data should be more securely encrypted, based upon one or more characteristics of that item of data and/or selection rules 637. If an item of data is to be encrypted and security level module 636 detects that the item of data should be more securely encrypted, security level module 636 causes the item of data and/or its encryption key to be input to selectable modification module 630. Selectable modification module 630 can then combine the item of data and/or encryption key with seed value 635. Control module 600 can then cause that modified encryption key to be provided to encryption module 625 and/or the modified item of data to be processed by, for example, hash module 610 and encryption module 625.

As noted above, hash module 610 implements one or more cryptographic hash algorithms that can be applied to an item of data, or data derived from such an item of data, in order to generate a hash of that data. The resulting hash can then be used as an encryption key or identifier. In one embodiment, hash module 610 implements a version of Secure Hash Algorithm (SHA), such as SHA-1. In other embodiments, other cryptographically secure (e.g., relatively collision resistant and non-invertible) hash algorithms can be implemented. In general, hash module 610 implements a hash function that is resistant to collisions (e.g., for a 128-bit hash value size, a function that requires $2^{127}$ attempts to find a data value that hashes to the same hash value as another data value is collision-resistant) and non-invertible (e.g., given a particular hash, it is relatively difficult to reconstruct the associated data value from which that hash was generated). Examples of hash algorithms that can be used by hash module 610 include (but are not limited to) Message Digest algorithm 5 (MD5), SHA-1, SHA-224, SHA-256, SHA-384, SHA-512, Research and Development in Advanced Communications Technologies in Europe (RACE) Integrity Primitives Evaluation Message Digest (RIPEMD), RIPEMD-128, RIPEMD-160, RIPEMD-250, RIPEMD-320, and RIPEMD-512.

In some embodiments (e.g., where the cryptographic hash algorithm being used by hash module 610 operates on fixed-size units of data), at least some items of data can be broken up into sub-units of a fixed size prior to being hashed, and the cryptographic hash algorithm can be applied iteratively to successive sub-units when generating a hash of the entire item of data. If one of the sub-units is smaller than a prespecified size (e.g., this size can be the same as a fixed size of the sub-units mentioned above), a predetermined value (e.g., all ones or all zeros) can be prepended and/or appended to that sub-unit until the size of the "padded" sub-unit is equal to the prespecified size.

In such a situation, an intermediate value can be generated for each sub-unit, and the hash for the entire item of data can be generated by combining (e.g., using a bitwise XOR) the intermediate values. Alternatively, the hash can be generated by concatenating the intermediate values and then applying the cryptographic hash algorithm to the concatenated value. Other techniques can also be used to combine several intermediate values into a single hash value.

The program instructions and data implementing storage client 20 can be stored on various computer readable storage media such as memory 604. In some embodiments, such software is stored on a computer readable storage medium such as a CD (Compact Disc), DVD (Digital Versatile Disc), hard disk, optical disk, tape device, floppy disk, and the like). In order to be executed by one or more processors 602, the instructions and data implementing storage client 20 can be loaded into memory 604 from the other computer readable storage medium. The instructions and/or data implementing storage client 20 can also be transferred to computing device 10 for storage in memory 604 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:
   generating an encryption key for use in encrypting first data for a first client of a plurality of clients, wherein the encryption key is based upon a hash of the first data to be encrypted;
   detecting that the first client has specified that a higher level of security is to be applied to the first data, wherein the detecting comprises accessing information specific to the first client on a storage device, and wherein the detecting is based on one or more of an attribute of the first data, an identity of the first data, or a data pattern included within or associated with the first data;
   in response to detecting that the higher level of security has been specified for the first data, modifying at least one of the first data to be encrypted and the encryption key, based upon a client-specific value confidential to the first client;
   subsequent to the modifying, generating a first identifier for the first data to be encrypted, based upon at least one of the first data to be encrypted and the encryption key, wherein the first identifier is different from a second identifier, wherein the second identifier is generated to identify second data for a second client of the plurality of clients, and wherein the second data is identical to the first data;
   detecting whether an encrypted copy of the first data is already stored by a storage system that performs data deduplication, based upon whether the first identifier matches any of a plurality of identifiers associated with data at the higher security level, stored by the storage system, and wherein the storage system is operated by a third-party entity that is not one of the plurality of clients;
   generating a third identifier for third data for the first client;
   detecting that the first client has specified that the higher level of security is not to be applied to the third data;
   in response to the detecting that the higher level of security is not to be applied, generating a fourth identifier for the third data, wherein the fourth identifier is identical to a fifth identifier, wherein the fifth identifier is generated to identify fourth data for the second client of the plurality of clients, and wherein the third data is identical to the fourth data; and detecting whether an encrypted copy of the third data is already stored by the storage system, based upon whether the fourth identifier matches any of the plurality of identifiers.

2. The computer-implemented method of claim 1, wherein the detecting that the higher level of security has been specified comprises comparing the attribute of the first data to a first attribute.

3. The computer-implemented method of claim 1, wherein the detecting that the higher level of security has been specified comprises comparing a first identity to the identity of the first data.

4. The computer-implemented method of claim 1, wherein
an item of data is associated with a first data pattern if the item of data comprises the first data pattern or can be processed to generate the first data pattern, and
the detecting that the higher level of security has been specified comprises comparing the first data pattern to the data pattern associated with the first data.

5. The computer-implemented method of claim 1, wherein
the detecting that the higher level of security has been specified comprises accessing the attribute of the data, and
a value of the attribute specifies whether the higher level of security applies to the first data.

6. The computer-implemented method of claim 5, further comprising:
setting the attribute of the first data, based upon whether the information specifies that the higher level of security applies to the first data.

7. The computer-implemented method of claim 1, wherein
the modifying comprises modifying the first data to be encrypted, and
the modifying is performed prior to the generating the encryption key.

8. The computer-implemented method of claim 1, wherein
the modifying comprises modifying the encryption key, and
the generating the first identifier is based upon the modified encryption key.

9. A non-transitory computer readable storage medium storing program instructions, wherein the program instructions are executable by one or more processors to:
generate an encryption key for use in encrypting first data for a first client of a plurality of clients, wherein the encryption key is based upon a hash of the first data to be encrypted;
detect that the first client has specified that a higher level of security is to be applied to the first data by accessing information specific to the first client on a storage device, and wherein the detecting is based on one or more of an attribute of the first data, an identity of the first data, or a data pattern included within or associated with the first data;
modify at least one of the first data to be encrypted and the encryption key, based upon a client-specific value confidential to the first client, prior to the generating the identifier, in response to detecting that the higher level of security has been specified for the data;
subsequent to the modification, generate a first identifier for the first data to be encrypted, based upon at least one of the first data to be encrypted and the encryption key, wherein the first identifier is different from a second identifier, wherein the second identifier is generated to identify second data for a second client of the plurality of clients, and wherein the second data is identical to the first data;

detect whether an encrypted copy of the first data is already stored by a storage system that performs data deduplication, based upon whether the first identifier matches any of a plurality of identifiers associated with data at the higher security level stored by the storage system, wherein the storage system is operated by a third-party entity that is not one of the plurality of clients;
generate a third identifier for third data for the first client;
detect that the first client has specified that the higher level of security is not to be applied to the third data;
in response to the detecting that the higher level of security is not to be applied, generate a fourth identifier for the third data, wherein the fourth identifier is identical to a fifth identifier, wherein the fifth identifier is generated to identify fourth data for the second client of the plurality of clients, and wherein the third data is identical to the fourth data; and
detect whether an encrypted copy of the third data is already stored by the storage system, based upon whether the fourth identifier matches any of the plurality of identifiers.

10. The non-transitory computer readable storage medium of claim 9, wherein
detection that the higher level of security has been specified involves a comparison of the attribute of the first data to a first attribute.

11. The non-transitory computer readable storage medium of claim 9, wherein
detection that the higher level of security has been specified involves a comparison of a first identity to the identity of the first data.

12. The non-transitory computer readable storage medium of claim 9, wherein
an item of data is associated with a first data pattern if the item of data comprises the first data pattern or can be processed to generate the first data pattern, and
detection that the higher level of security has been specified involves a comparison of the first data pattern to the data pattern associated with the first data.

13. The non-transitory computer readable storage medium of claim 9, wherein
detection that the higher level of security has been specified involves accessing the attribute of the first data, and
a value of the attribute specifies whether the higher level of security applies to the first data.

14. The non-transitory computer readable storage medium of claim 13, wherein the program instructions are further executable to:
set the attribute of the first data, based upon whether the information specifies that the higher level of security applies to the first data.

15. The non-transitory computer readable storage medium of claim 9, wherein
modifying the at least one of the first data to be encrypted and the encryption key comprises modifying the first data to be encrypted, and
the first data to be encrypted is modified prior to generation of the encryption key.

16. The non-transitory computer readable storage medium of claim 9, wherein
modifying the at least one of the first data to be encrypted and the encryption key comprises modifying the encryption key, and
generation of the first identifier is based upon the modified encryption key.

17. A system comprising:
a network interface; and a storage client coupled to the network interface, wherein the storage client is configured to:
  generate an encryption key for use in encrypting first data for a first client of a plurality of clients, wherein the encryption key is based upon a hash of the first data to be encrypted;
  detect that the first client has specified that a higher level of security is to be applied to the first data by accessing information specific to the first client on a storage device, wherein the detecting is based on one or more of an attribute of the first data, an identity of the first data, or a data pattern included within or associated with the first data;
  modify at least one of the first data to be encrypted and the encryption key, based upon a client-specific value, confidential to the first client, in response to detecting that the higher level of security has been specified for the first data;
  subsequent to the modification, generate a first identifier for the first data to be encrypted, based upon at least one of the first data to be encrypted and the encryption key, wherein the first identifier is different from a second identifier, wherein the second identifier is generated to identify second data for a second client of the plurality of clients, and wherein the second data is identical to the first data;
  detect whether an encrypted copy of the first data is already stored by a storage system that performs data deduplication, based upon whether the first identifier matches any of a plurality of identifiers associated with data at the higher security level stored by the storage system, and wherein the storage system is operated by a third-party entity that is not one of the plurality of clients;
  generate a third identifier for third data for the first client;
  detect that the first client has specified that the higher level of security is not to be applied to the third data;
  in response to the detecting that the higher level of security is not to be applied, generate a fourth identifier for the third data, wherein the fourth identifier is identical to a fifth identifier, and wherein the fifth identifier is generated to identify fourth data; and
  detect whether an encrypted copy of the third data is already stored by the storage system, based upon whether the fourth identifier matches any of the plurality of identifiers.

18. The system of claim 17, wherein
detection that the higher level of security has been specified involves a comparison of a first identity to the identity of the first data.

19. The system of claim 17, wherein
an item of data is associated with a first data pattern if the item of data comprises the first data pattern or can be processed to generate the first data pattern, and
detection that the higher level of security has been specified involves a comparison of the first data pattern to the data pattern associated with the first data.

20. The system of claim 17, wherein the storage client is further configured to:
  set the attribute of the data, based upon whether the information specifies that the higher level of security applies to the first data, wherein
  a value of the attribute specifies whether the higher level of security applies to the first data, and
  detection that the higher level of security has been specified involves accessing the attribute of the first data.

* * * * *